US008972942B2

(12) United States Patent
Gu et al.

(10) Patent No.: US 8,972,942 B2
(45) Date of Patent: Mar. 3, 2015

(54) UNIT TESTING AN ENTERPRISE JAVABEANS (EJB) BEAN CLASS

(75) Inventors: Geng Xian Gu, Shanghai (CN); Hai Dong Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 13/552,870

(22) Filed: Jul. 19, 2012

(65) Prior Publication Data

US 2014/0026120 A1 Jan. 23, 2014

(51) Int. Cl.
*G06F 9/44* (2006.01)
(52) U.S. Cl.
USPC .......................................... 717/124; 717/126
(58) Field of Classification Search
USPC .......................................................... 717/124
See application file for complete search history.

(56) References Cited

U.S. PATENT DOCUMENTS

| 6,925,633 | B1 | 8/2005 | Barnett et al. |
| 7,707,553 | B2 | 4/2010 | Roques et al. |
| 7,865,779 | B2 | 1/2011 | Tsang |
| 8,627,296 | B1 * | 1/2014 | Picard ........................... 717/135 |
| 2005/0160104 | A1 * | 7/2005 | Meera et al. .................. 707/100 |
| 2008/0010074 | A1 * | 1/2008 | Brunswig et al. ................. 705/1 |
| 2008/0127093 | A1 | 5/2008 | Fernandez-Ivern et al. |
| 2009/0055686 | A1 * | 2/2009 | Tsang ............................. 714/33 |
| 2009/0178029 | A1 | 7/2009 | Akeel et al. |
| 2010/0007738 | A1 | 1/2010 | Lehnert |

OTHER PUBLICATIONS

Kong et al., The Extension of the Unit Testing Tool Junit for Special Testings, Proceedings of the First International Multi-Symposiums on Computer and Computational Sciences (MSCCS'06), 0-7695-2581-4/06 copyright 2006 IEEE, 6 pages.

* cited by examiner

*Primary Examiner* — Li B Zhen
*Assistant Examiner* — Sen Chen
(74) *Attorney, Agent, or Firm* — Schmeiser, Olsen & Watts; John Pivnichny

(57) ABSTRACT

An approach for unit testing an Enterprise JavaBeans® (EJB®) bean is presented. A test case for unit testing the EJB® bean is initiated. An indication of a JUnit or an in-container testing mode is received. The unit testing of the EJB® bean in the indicated mode is initiated by injecting the EJB® bean by an injection functionality included in a test framework if the JUnit testing mode is indicated, or by an EJB® container if the in-container testing mode is indicated. A test object in the injected EJB® bean operates business logic on business data by inserting, updating or deleting business data, or by selecting business data to send to a client, thereby generating a set of resulting business data. An assertion operation on the set of resulting business data against expected data determines whether the test case succeeds or fails.

19 Claims, 12 Drawing Sheets

300 ↴

```
Configuration file for Cactus is cactus test          302
ejb.isCactusTest = ┌──────┐
                  │ false │
                  └──────┘
# jdbc info                                              304
jdbc.url = jdbc:oracle:thin┌─────────────────────┐
                           │@9.123.52.63:1521:XE │
jdbc.uid = xxdb            └─────────────────────┘
jdbc.pwd = xxdb

# EJB POJO Test
Ejb.data.source = DBConnect

# DB Retry (ma)
database.RetryTime = 500
database.RetryCount = 10

# EJB provider url
ejb.providerURL = iiop://localhost:2809/

# Web app Context under which our application to test runs  306
cactus.contextURL = http://localhost:9080/┌──────────────┐
                                          │BC_G_SampleWeb│
                                          └──────────────┘
# Default Servlet Redirector Name.
# Used by ServletTestCase test cases.

Cactus.servletRedirectorName = ServletTestRedirector
```

```
<?xml version="1.0" encoding="UTF-8"?>
<web-app id="WebApp_ID" version="2.5" xmlns="http://java.sun.
    com/xml/ns/javaee" xmlns:xsi …
    <display-name>
    BC_B_SampleWeb</display-name>
    <servlet>
        <servlet-name>ServletTestRedirector</servlet-name>
        <servlet-class>org.apache.cactus.server.
            ServletTestRedirector</servlet-class>
    </servlet>
    <servlet-mapping>
        <servlet-name>ServletTestRedirector</servlet-name>
        <url-pattern>/ServletTestRedirector</url-pattern>
    </servlet-mapping>

<welcome-file-list>
        <welcome-file>index.html</welcome-file>
        <welcome-file>index.htm</welcome-file>
        <welcome-file>index.jsp</welcome-file>
        <welcome-file>default.html</welcome-file>
        <welcome-file>default.htm</welcome-file>
        <welcome-file>default.jsp</welcome-file>
    </welcome-file-list>
</web-app>
```

```
private void doPreRun() {
    dataMap = new HashMap<String, List<Map<String,
String>>>();
    CommonUtilities.createTestData(getClass().getName(),
    getName(), dataMap, isStringTrim);
    beanMap = new HashMap<String, Object>();

//Test environment
    if (CommonUtilities.isCactusTest()) {
        // Cactus test environment
        instanceEJBBeans(this);
    } else {
        //POJO test environment
        instancePOJOBean(this, true);
    }
}
```

*FIG. 7*

```
                              800 private Object instanceEJBBean(Object beanObj) {
  Object objBean = null;
  try {
    InitialContext context = new InitialContext();

Field[] fields = beanObj.getClass().getDeclaredFields();
    for (Field field : fields) {
      if (isNeedInstanced(field, true)) }
        String name = CommonConstant.EJB_JNDI_NAME_PREFIX +
        field.getType().getName();
        Object subBean = context.lookup(name);
        if (subBean != null) {
          field.setAccessible(true);
          field.set(beanObj, subBean);
          beanMap.put(field.getType().getName(), subBean);
        }
      }
    }

} catch (Exception ex) {
    throw new CommonRuntimeException(ex);
  }
  return objBean
}
```

*FIG. 8*

```
1000
public static Test createTestSuite(Class<?>... classes) {
  if (CommonUtilities.isCactusTest() == true
    ServletTestSuite suite = new ServletTestSuite();
    for (Class<?> cls : classes) {
      suite.addTestSuite(cls);
    }
    return suite;

} else {
     TestSuite suite = new TestSuite();
     for (Class<?> cls : classes) {
       suite.addTestSuite(cls);
     }
     return suite;
  }
}
```

*FIG. 10*

```
1100
public class Pattern010Test extends CommonTestCase { protected Pattern010Local ejbService public static Test suite() {
    Class<?> currClass = new CurrentClassGetter().
    getCurrentClass();
    return CommonUtilities.createTestSuite(currClass);
  } public void testCase00() throws Exception {
```

UNIT TESTING AN ENTERPRISE JAVABEANS (EJB) BEAN CLASS

TECHNICAL FIELD

The present invention relates to a data processing method and system for unit testing, and more particularly to a technique for unit testing a component in an architecture for modular construction of an enterprise application.

BACKGROUND

Unit testing tests whether units of source code, usage procedures, operating procedures, and sets of computer program module(s) together with associated control data work correctly. Unit testing in object-oriented programming tests whether or not a class is fit for use. A known technique for unit testing an ENTERPRISE JAVABEANS® (EJB®) bean is performed on an EJB® container of a WEBSPHERE® Application Server by using features provided by EJB® architecture, such as annotation and runtime injection, and is referred to herein as an in-container testing mode. Each time source code is changed during testing, the aforementioned application server needs to reboot or redeploy. The in-container testing mode is provided in the Apache Cactus test framework for unit testing developed by the Apache Software Foundation. Alternatively, known unit testing of an EJB® bean uses a JUnit testing mode, whereby a unit test case cannot be reused in the in-container testing mode. The JUnit testing mode employs pure JUnit testing in a JUnit testing framework, which is a unit testing framework for the JAVA® programming language.

An EJB® bean is a software component of the EJB® architecture, which is a server-side component architecture for modular construction of enterprise applications offered by Oracle Corporation located in Redwood Shores, Calif. WEBSPHERE® Application Server is an application server offered by International Business Machines Corporation located in Armonk, N.Y. ENTERPRISE JAVABEANS, EJB and JAVA are registered trademarks of Oracle Corporation. WEBSPHERE is a registered trademark of International Business Machines Corporation.

BRIEF SUMMARY

In a first embodiment, the present invention provides a method of unit testing an EJB® bean. The method comprises the steps of:

a computer initiating a test case for a unit testing of the EJB bean with test data, the step of initiating the test case including a step of the computer receiving an indication that indicates a JUnit testing mode;

based on the received indication indicating the JUnit testing mode and not indicating an in-container testing mode, the computer initiating the unit testing of the EJB® bean in the JUnit testing mode by injecting the EJB® bean by an injection functionality included in a test framework being executed by the computer;

a test object of the injected EJB® bean operating business logic on business data by performing a step of inserting the business data into a database, updating the business data in the database, deleting the business data from the database, or selecting the business data to send to a client, an outcome of the step of operating the business logic being a set of resulting business data;

the computer retrieving expected data corresponding to the test data and subsequently, the computer asserting the set of resulting business data against the retrieved expected data; and based on the step of asserting the set of resulting business data against the retrieved expected data, the computer determining the test case succeeds or fails.

A system, program product and a process for supporting computing infrastructure where the process provides at least one support service are also described and claimed herein, where the system, program product and process for supporting computing infrastructure correspond to the aforementioned method.

Embodiments of the present invention increase unit testing efficiency by integrating an in-container testing mode as an extension to a pure JUnit testing mode, thereby allowing the utilization of a unit test case from the beginning of a coding phase to the end of the testing phase of a project and allowing a unit test case in JUnit testing to be re-used in in-container testing. The extension of the JUnit testing mode may include the injection functionality of an EJB® container testing mode. Embodiments disclosed herein extend the TestCase class of JUnit and implements the functionality provided by ServletTestSuite in the Apache Cactus test framework. Embodiments of the present invention increase coding and testing efficiency by avoiding a need to redeploy the WEBSPHERE® Application Server in response to changes in the source code. Furthermore, embodiments disclosed herein provide automatic testing from the beginning of test data preparation to the end of test result assertion, thereby avoiding the manual preparation of test data into a database.

BRIEF DESCRIPTION OF THE DRAWINGS

FIG. 3 is a configuration file used by the test framework included in the system of FIG. 1, in accordance with embodiments of the present invention.

FIG. 4 is a deployment descriptor that redirects a test client to the test framework included in the system of FIG. 1, in accordance with embodiments of the present invention.

FIG. 7 is exemplary code for the doPreRun method called from the code in FIG. 6, in accordance with embodiments of the present invention.

FIG. 8 is exemplary code for injecting a test object by an EJB® container from a method call in the code in FIG. 7, in accordance with embodiments of the present invention.

FIG. 10 is exemplary code for the createTestSuite method in the class diagram of FIG. 5, in accordance with embodiments of the present invention.

FIG. 11 is exemplary code for the suite method in the class diagram of FIG. 5, in accordance with embodiments of the present invention.

DETAILED DESCRIPTION

Overview

Embodiments of the present invention provide a test framework that performs unit testing of an EJB® bean by integrating advantageous features of the JUnit testing mode with advantageous features of the in-container testing mode. Core functionalities of an embodiment of the present invention include:

- Functionality of the JUnit testing mode extended to perform JUnit testing with the injection feature of the in-container testing mode, with no dependence on the application server, thereby increasing test efficiency without the application server needing to reboot or redeploy.
- Functionality of injection that can inject a required EJB® bean or JAVA® Persistence API (JPA) entity manager into a test object at runtime like the injection feature of the in-container testing mode. This functionality is an improvement over the known pure JUnit testing in which there is no application server support for the injection of EJB® beans at runtime.
- Functionality of the in-container testing mode extended to perform re-used JUnit unit test cases through the ServletTestSuite provided by the Apache Cactus test framework. The extension of the functionality of the in-container testing mode allows a performance and re-use of the JUnit test cases directly in the EJB® container to test an EJB® bean class without any changes to the test cases, and a return of the test results from the application server to the test client.
- Functionality of an automatic test unit provides automatic testing from the beginning of test data preparation to the end of test result assertion. In one embodiment, the testing framework allows a visual construction of test data in the format of a spreadsheet application (e.g., Microsoft® Excel® spreadsheet application), an automatic operation of the constructed test data, and a calculation of test results based on the test data.

System for Unit Testing a Bean Class

Figure 1:
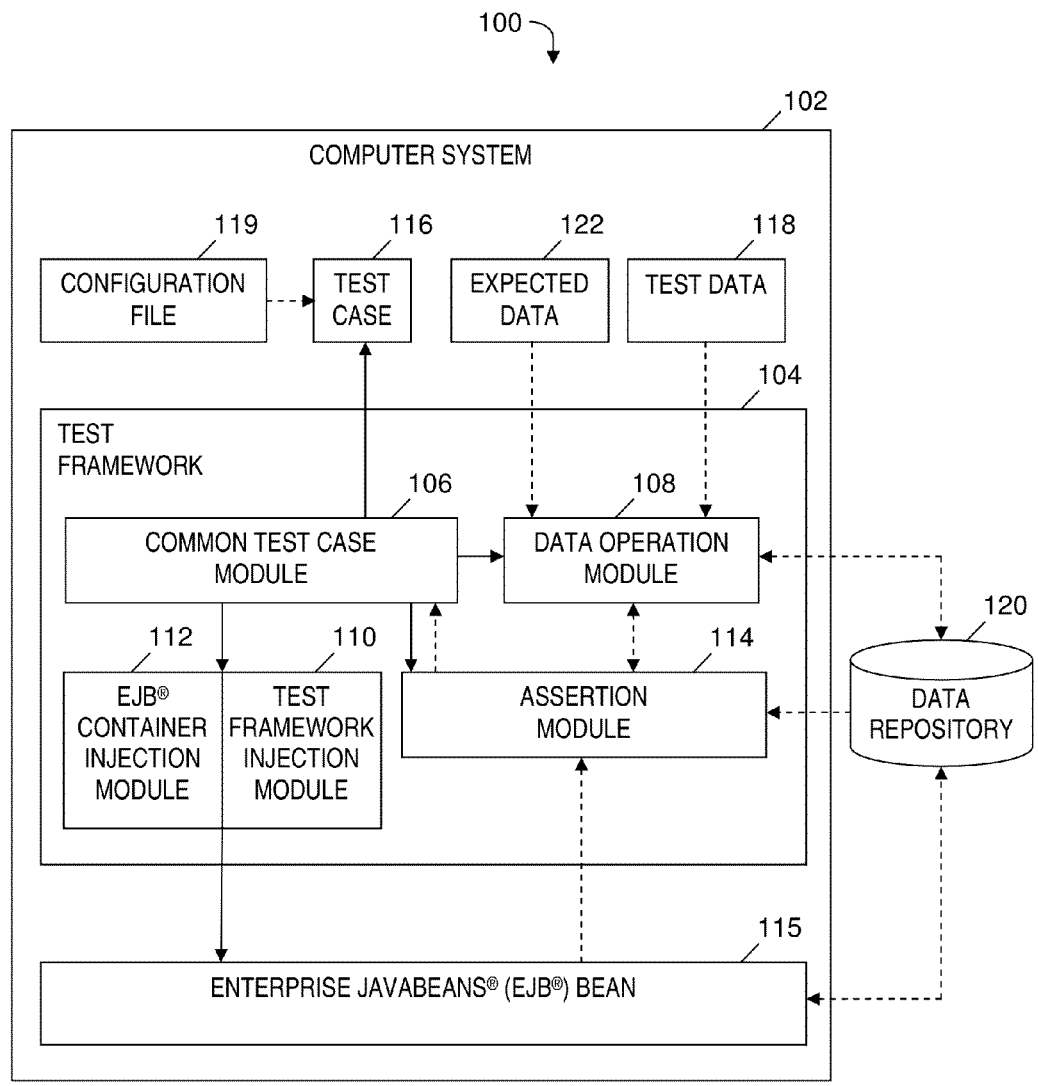
FIG. 1 is a system context diagram of a system for unit testing an EJB® bean class, in accordance with embodiments of the present invention.

FIG. 1 is a system context diagram of a system for unit testing an EJB bean class, in accordance with embodiments of the present invention. Execution flow is indicated by the solid arrows and data flow is indicated by the dashed arrows in FIG. 1. System 100 includes a computer system 102, which runs a software-based test framework 104. Test framework 104 includes the following software-based modules: common test case module 106, data operation module 108, test framework injection module 110, EJB® container injection module 112 and assertion module 114.

Common test case module 106 receives an instruction to perform a unit test of EJB® bean 115, initiates a test case 116 with test data 118 retrieved by data operation module 108 and according to a configuration included in a configuration file 119, and creates an instance of a test class (also known as (a.k.a.) a test case class; not shown). In one embodiment, the test class is a JAVA® object that includes test case 116. Further, based on an testing mode indicated in configuration file 119, common test case module 106 initiates an injection of EJB® bean 115 by running either test framework injection module 110 or EJB® container injection module 112 to inject EJB® bean 115. Still further, common test case module 106 performs test case 116 by operating business logic on business data, where data operation module 108 retrieves the business logic and business data from a database or other data structure included in data repository 120. Common test case module 106 makes an assertion by running assertion module 114 to generate a test result based on asserting data resulting from operating the business logic against expected data 122.

Additional details of the functionality of the components of system 100 are described below relative to the discussions of FIG. 2 and FIG. 5.

Process for Unit Testing a Bean Class

Figure 2:
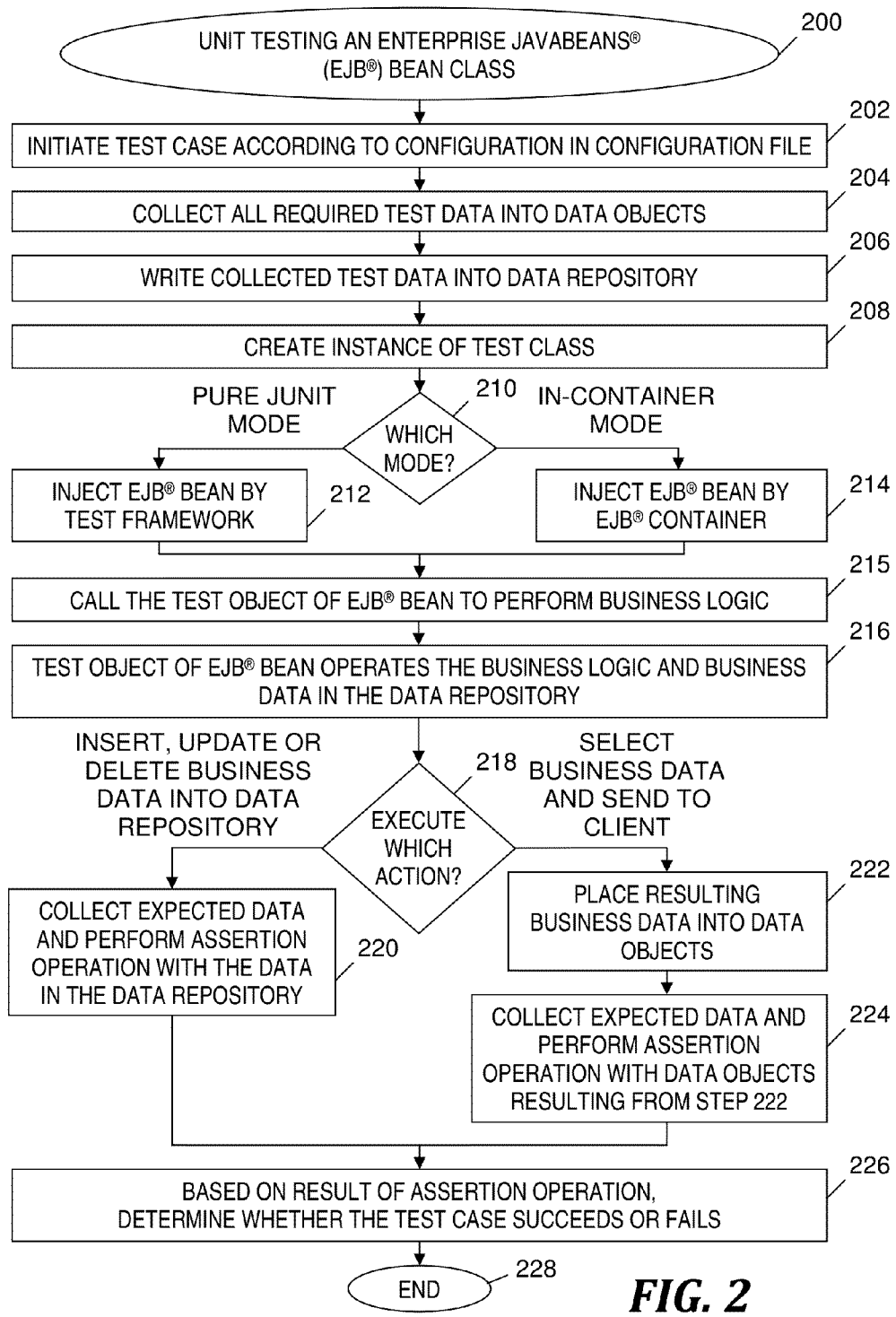
FIG. 2 is a flowchart of a process of unit testing an EJB® bean class in the system of FIG. 1, in accordance with embodiments of the present invention.

FIG. 2 is a flowchart of a process of unit testing an EJB® bean class in the system of FIG. 1, in accordance with embodiments of the present invention. The process of unit testing an EJB® bean class begins at step 200. In step 202, common test case module 106 (see FIG. 1) initiates test case 116 with test data 118 (see FIG. 1) to unit test EJB® bean 115 (see FIG. 1) according to a configuration that specifies a testing mode for the unit test. Common test case module 106 (see FIG. 1) determines the aforementioned configuration in step 202 by retrieving the configuration from configuration file 119. For example, common test case module 106 (see FIG. 1) retrieves the configuration from a Java® properties file named cactus.properties. The testing mode specified in the configuration file 119 indicates either an in-container testing mode (e.g., EJB® container testing mode) or a JUnit testing mode.

In one embodiment, a programmer or other user initially sets a value in configuration file 119 to indicate the JUnit testing mode while the source code being unit tested is in a beta phase (i.e., a non-stable phase). When all test cases of a test class are executed successfully (e.g., with green status) in the JUnit testing mode, it is an indication that the source code has stepped into a stable phase. When the source code is in a stable phase, the programmer or other user changes the value in configuration file 119 (see FIG. 1) to indicate the in-container testing mode. As one example, the programmer sets ejb.isCactusTest in configuration file 119 (see FIG. 1) to "false" to indicate the JUnit testing mode (i.e., during the beta phase of the source code), and then changes ejb.isCactusTest to "true" to indicate the in-container testing mode (i.e., after the source code enters a stable phase). FIG. 3 includes an example of configuration file 119 (see FIG. 1) that illustrates ejb.isCactusTest having the value of false to indicate the JUnit testing mode.

In step 204, common test case module 106 (see FIG. 1) initiates test data for the test case initiated in step 202 by collecting all required test data into data objects by directing data operation module 108 (see FIG. 1). In one embodiment, common test case module 106 (see FIG. 1) retrieves all required data from a spreadsheet file (e.g., a Microsoft® Excel® spreadsheet file) and collects the required data into Data Transfer Objects (DTOs). Prior to step 204, a user utilizing a spreadsheet application constructed the required data in the spreadsheet file.

In step 206, common test case module 106 (see FIG. 1) directs data operation module 108 (see FIG. 1) to write the data collected in step 204 into a database or other data structure residing in data repository 120 (see FIG. 1). The database may be, for example, a DB2® database or an ORACLE® database.

In step 208, common test case module 106 (see FIG. 1) creates an instance of the test class that includes test case 116 (see FIG. 1).

In step 210, common test case module 106 (see FIG. 1) determines the unit testing mode specified in configuration file 119. If the unit testing mode determined in step 210 is the JUnit testing mode, then step 212 is performed. In step 212, test framework injection module 110 (see FIG. 1) injects EJB® bean 115 (see FIG. 1) using injection functionality added to test framework 104 (see FIG. 1) prior to the process of FIG. 2. As used herein, injecting an EJB® bean is defined as creating an instance of a JAVA® object.

Returning to step 210, if the unit testing mode is determined to be the in-container unit testing mode, then step 214 is performed. In step 214, EJB® container injection module 112 (see FIG. 1) (i.e., the EJB® container of an application server such as WEBSPHERE® Application Server) performs an in-container injection of the EJB® bean 115 (see FIG. 1) (i.e., leverages the EJB® container to inject the EJB® bean 115 (see FIG. 1) directly).

Step 215 immediately follows step 212 and step 214. In step 215, common test case module 106 (see FIG. 1) directs test case 116 (see FIG. 1) to call a test object of EJB® bean 115 (see FIG. 1) to perform business logic included in the database or other data structure residing in data repository 120 (see FIG. 1). As used herein, a test object is defined as a unit testing object of an EJB® bean which operates test data based on business logic.

In step 216, the test object called in step 215 performs unit testing by operating the business logic and business data (a.k.a. the test data collected in step 204) in the database or other data structure included in data repository 120 (see FIG. 1) and subsequently executes an action.

In step 218, the test object determines whether the action executed in step 216 is (1) an insertion of business data into, an update of business data in, or a deletion of business data in the database or other data structure in data repository 120 (see FIG. 1), or (2) a selection of business data and sending the selected business data to a client computer system (e.g., a client computer system interacting with a WEBSPHERE® Application Server). If step 218 determines that the executed action is the aforementioned insertion, update or deletion of business data, then step 220 is performed. In step 220, common test case module 106 (see FIG. 1) collects the expected data 122 (see FIG. 1) from a spreadsheet file (e.g., a Microsoft® Excel® spreadsheet file) and then directs assertion module 114 (see FIG. 1) to perform an assertion operation with data in the database or other data structure residing in data repository 120 (see FIG. 1) (i.e., the data resulting from the operation of the business logic in step 216). In one embodiment, the assertion operation is performed on the data after the data is retrieved from the data repository 120 (see FIG. 1) and placed in computer memory. As used herein, an assertion operation is defined as an operation that compares test results with expected data.

Returning to step 218, if the test object determines that that the executed action is the aforementioned selection of business data and sending the business data to the client, then step 222 and step 224 are performed. In step 222, common test case module 106 (see FIG. 1) places the set of business data resulting from the operation of the business logic in step 216 into data objects (e.g., DTOs). In one embodiment, step 222 places the set of business data in DTOs in computer memory. In step 224, common test case module 106 (see FIG. 1) collects the expected data 122 (see FIG. 1) from a spreadsheet file (e.g., a Microsoft® Excel® spreadsheet file) and then directs assertion module 114 (see FIG. 1) to perform an assertion operation with the data in the data objects resulting from step 222. In one embodiment, the assertion operation is performed on the data in the data objects, which reside in computer memory.

Step 226 immediately follows step 220 and step 224. In step 226, based on the result (i.e., test result) of the assertion operation performed in step 220 or step 224, common test case module 106 (see FIG. 1) determines whether the test case initiated in step 202 succeeds or fails.

Configuration File Example

FIG. 3 is a configuration file used by the test framework included in the system of FIG. 1, in accordance with embodiments of the present invention. Configuration file 300 is an example of a cactus.properties file retrieved in step 202 (see FIG. 2) that specifies a configuration for test case 116 (see FIG. 1). Configuration file 300 includes an indication 302 of the unit testing mode for the unit test of EJB® bean 115 (see FIG. 1). Indicator 302 having a "false" value indicates that the unit testing mode is JUnit testing mode. A true value for indicator 302 in another example (not shown) indicates that the unit testing mode is the in-container testing mode, where a test case class project and test object project of an EJB® project is deployed on a running WEBSPHERE® Application Server.

Connection information 304 in configuration file 300 includes database connection information, which is set according to the actual project.

Project 306 in configuration file 300 includes an identification of the project for creating classes of test case 116 (see FIG. 1).

Deployment Descriptor

FIG. 4 is a deployment descriptor that redirects a test client to the test framework included in the system of FIG. 1, in accordance with embodiments of the present invention. In one embodiment, test framework 104 (see FIG. 1) uses deployment descriptor 400 so that JAVA® Servlet technology performs the unit testing of EJB® bean 115 (see FIG. 1) in the EJB® container unit testing mode (i.e., the steps of FIG. 2 that follow the right side branch of step 210). In this case, the test project must be configured according to configuration 402, which ensures that a request from the test client is redirected to test framework 104 for performing test case 116 (see FIG. 1) in WEBSPHERE® Application Server.

Common Test Case Class

In one embodiment, the functionality of injecting the EJB® bean by the test framework in the pure JUnit mode in step 212 (see FIG. 2) or in-container mode in step 214 (see FIG. 2) is provided by an integration of two unit test suites: one test suite for a test object of an EJB® bean for performance in an EJB® container (i.e., in-container testing mode) and another test suite for the test object for performance in a Java® SE environment (i.e., JUnit testing mode). In order to integrate the aforementioned test suites, injection functionality is provided in the Pure JUnit test mode by providing a CommonTestCase class in the common test case module 106 (see FIG. 1). The CommonTestCase class is an extension of the TestCase class of JUnit. The CommonTestCase class integrates the base class of the EJB® container mode and the base class of the pure JUnit mode. An example of Java code that extends the TestCase class of JUnit to provide the CommonTestCase class is presented below:

```
public abstract class CommonTestCase extends TestCase {
    private EntityManager em = null;
    private EntityManagerFactory emf = null;
```

```
    private EntityTransaction tran = null;
    ......
}
```

Figure 5:
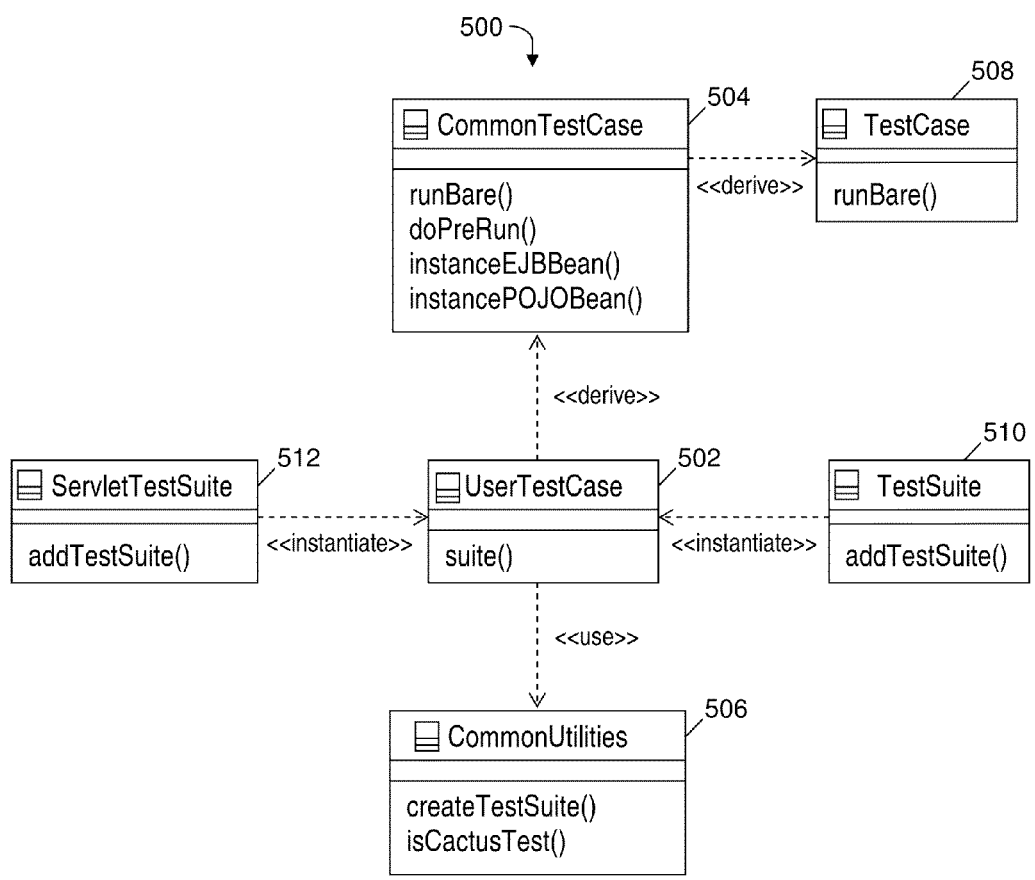
FIG. 5 is a class diagram for describing the core design of the test framework in the system of FIG. 1, in accordance with embodiments of the present invention.

FIG. 5 is the class diagram for describing the core design of test framework 104 (see FIG. 1), in accordance with embodiments of the present invention. Class diagram 500 includes the following classes: UserTestCase 502 (see sample test case class "Pattern010Test" of FIG. 11), CommonTestCase 504, CommonUtilities 506, TestCase 508, TestSuite 510 and ServletTestSuite 512. In one embodiment, UserTestCase 502, CommonTestCase 504 and CommonUtilities 506 are core parts of test framework 104 (see FIG. 1).

UserTestCase 502 is a user-defined test class in which a test suite is instantiated by an addTestSuite( ) method in ServletTestSuite 512 in EJB® container mode or by an addTestSuite( ) method in TestSuite 510 in pure JUnit mode. ServletTestSuite 512 and TestSuite 510 use a createTestSuite( ) method in CommonUtilities 506 to instantiate a test suite in UserTestCase 502.

In one embodiment, TestSuite 510 is the only entry point for integrating a framework supporting the EJB® container mode of unit testing with JUnit supporting the pure JUnit mode of unit testing.

In one embodiment, every test class must use the createTestSuite( ) method in CommonUtilities 506 to transform an extended test class into a corresponding test suite which belongs to the framework supporting the EJB® container mode of unit testing or belongs to the pure JUnit mode of testing. As one example, see FIG. 11 for Java® code that transforms a sample extended test class into a corresponding test suite.

Figure 6:
FIG. 6 is exemplary code for overwriting a runBare method in the class diagram of FIG. 5, in accordance with embodiments of the present invention.

FIG. 6 is exemplary Java® code for overwriting a runBare method in the class diagram of FIG. 5, in accordance with embodiments of the present invention. Code 600 includes the runBare method included in CommonTestCase 504 (see FIG. 5), which extends the TestCase class in the JUnit framework supporting the JUnit mode of unit testing. Code 600 initiates tasks including injecting an EJB® bean and preparing data, as described below relative to FIG. 7. In one embodiment, code 600 is run to perform step 215 in FIG. 2.

FIG. 7 is exemplary Java® code for the doPreRun method called from the code in FIG. 6, in accordance with embodiments of the present invention. Code 700 includes a doPreRun method that initiates data into a database and injects an EJB® bean and a JPA EntityManager. Having a call to an instancePOJOBean method, code 700 adds EJB® injection support to test framework 104 (see FIG. 1) and ensures that test cases are performed seamlessly across the pure JUnit mode and the EJB® container mode. The instancePOJOBean method is described below relative to FIG. 9. POJO refers to Plain Old Java Object, which is a simple JAVA® object. In one embodiment, code 700 is run to perform step 210 in FIG. 2.

FIG. 8 is exemplary Java® code for injecting a test object by an EJB® container from a method call in the code in FIG. 7, in accordance with embodiments of the present invention. Code 800 includes an instanceEJBBean method, which is called if the EJB bean 115 (see FIG. 1) is tested in the EJB® container mode by EJB container injection module 112 (see FIG. 1). The instanceEJBBean method in code 800 looks up a test object from an EJB® context environment, and the test object is injected by the EJB® container. In one embodiment, code 800 is run to perform step 214 in FIG. 2.

Figure 9:
FIG. 9 is exemplary code for injecting a test object by the framework supporting the EJB® container mode of unit testing from a method call in the code in FIG. 7, in accordance with embodiments of the present invention.

FIG. 9 is exemplary Java® code for injecting a test object by the framework supporting the EJB® container mode of unit testing from a method call in the code in FIG. 7, in accordance with embodiments of the present invention. Code 900 includes an instancePOJOBean method, which treats the EJB® bean 115 (see FIG. 1) as a simple JAVA® object (i.e., POJO) and is called if the EJB® bean 115 (see FIG. 1) is tested in the pure JUnit mode by test framework injection module 110 (see FIG. 1). The instancePOJOBean method performs injection for the EJB® bean 115 (see FIG. 1) in the same manner the EJB® bean 115 (see FIG. 1) is injected in the EJB® container mode, as described above relative to FIG. 8. In one embodiment, code 900 provides a novel functionality of test framework 104 (see FIG. 1) by ensuring that test case 116 (see FIG. 1) can be used in the pure JUnit unit testing mode and in the EJB® container unit testing mode without modification. In one embodiment, code 900 is run to perform step 212 in FIG. 2.

FIG. 10 is exemplary Java® code for the createTestSuite method in the class diagram of FIG. 5, in accordance with embodiments of the present invention. Code 1000 includes a createTestSuite method that provides functionality for integrating the JUnit testing framework and the framework that supports EJB® container unit testing, and that is used in each test case class (i.e., UserTestCase 502 in FIG. 5). In one embodiment, the createTestSuite method included in code 1000 is included in CommonUtilities 506 (see FIG. 5). If a test case is executed in the pure JUnit mode (i.e., the left side branch of step 210 in FIG. 2), then code 1000 processes the test case according to CommonTestCase 504 (see FIG. 5), which extends the TestCase class in the JUnit framework. If the test case is executed in the EJB® Container mode (i.e., the right side branch of step 210 in FIG. 2), then code 1000 processes the test case according to a ServletTestCase of the framework that supports EJB® container unit testing. In one embodiment, the ServletTestCase is provided by the ServletTestSuite functionality of the Cactus testing framework offered by the Apache Jakarta project.

FIG. 11 is exemplary Java® code for the suite method in the class diagram of FIG. 5, in accordance with embodiments of the present invention. Code 1100 includes a suite method included in a user-defined test class (i.e., UserTestCase 502 in FIG. 5). In code 1100, Pattern010Test is an example of a user-defined test class, which is processed according to CommonTestCase 504 (see FIG. 5) or by the ServletTestCase of the framework that supports EJB® container unit testing, as described above relative to FIG. 10. In one embodiment, the ServletTestCase is provided by the Cactus testing framework offered by the Apache Jakarta project.

Figure 12:
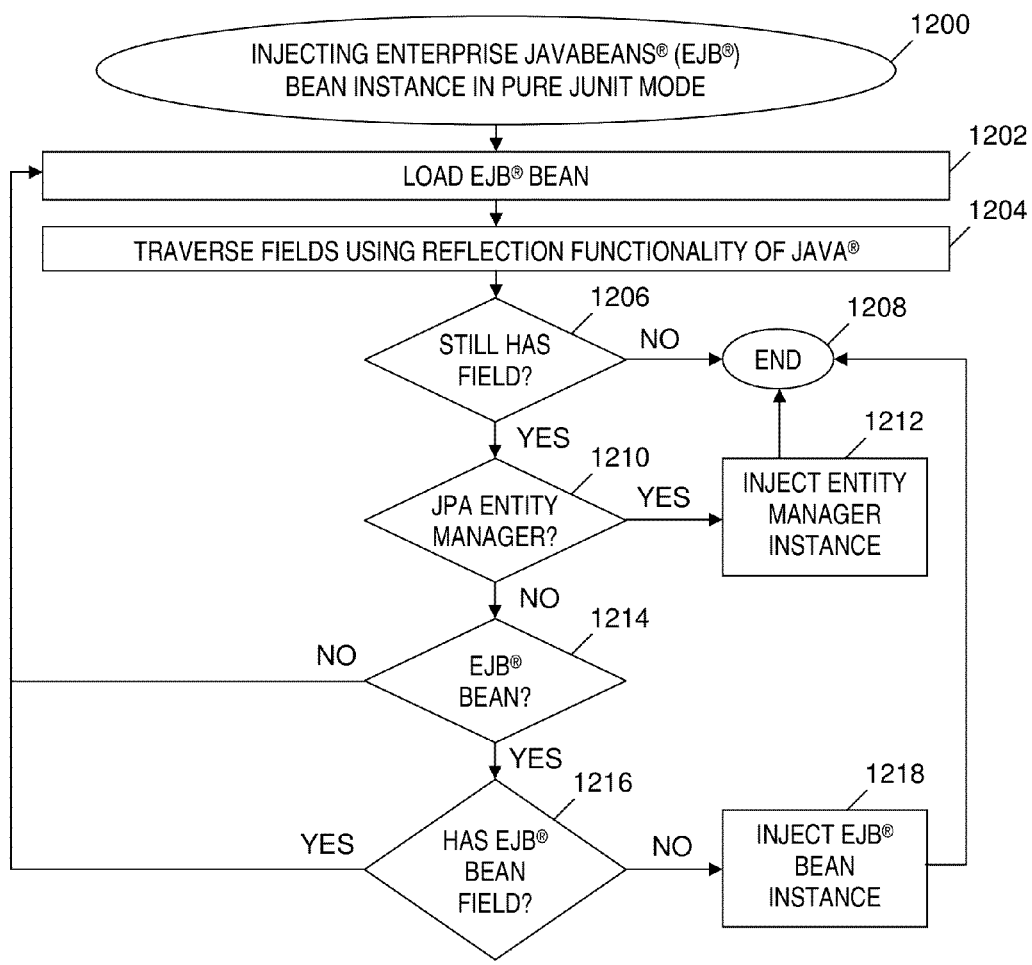
FIG. 12 is a flowchart of a process for injecting an EJB® bean instance in a pure JUnit mode in the process of FIG. 2, in accordance with embodiments of the present invention.

FIG. 12 is a flowchart of a process for injecting an EJB® bean instance in a pure JUnit mode in the process of FIG. 2, in accordance with embodiments of the present invention. The process of injecting an EJB® bean instance in a pure JUnit mode starts at step 1200. In step 1202, common test case module 106 (see FIG. 1) loads an EJB® bean, such as EJB® bean 115 (see FIG. 1).

In step 1204, common test case module 106 (see FIG. 1) traverses fields of the EJB® bean loaded in step 1202. In a first performance of step 1204, common test case module 106 (see FIG. 1) traverses a first field of the EJB® bean loaded in step 1202. If there is a next performance of step 1204, then common test case module 106 (see FIG. 1) traverses the next field of the aforementioned EJB® bean. Each JAVA® class, such as the EJB® bean class, has multiple fields that can be of different types (e.g., String, Boolean and self-defined class).

Step 1204 employs the reflection functionality of JAVA® to traverse each field of the EJB® bean loaded in step 1202 to obtain the type of the field.

Common test case module 106 (see FIG. 1) determines in step 1206 whether or not there is any field in the EJB® bean that remains to be processed by the steps in FIG. 12. If step 1206 determines that there is no field in the EJB® bean remaining to be processed, then the No branch of step 1206 is taken and the process of FIG. 12 ends at step 1208. If step 1206 determines that there is a field in the EJB® bean that remains to be processed by the process of FIG. 12, then the Yes branch of step 1206 is taken and step 1210 is performed.

Based on the type of the field obtained in step 1204, common test case module 106 (see FIG. 1) determines in step 1210 whether or not the field being traversed in step 1204 indicates a JPA entity manager. If step 1210 determines the field being traversed indicates a JPA entity manager, then the Yes branch of step 1210 is followed and step 1212 is performed; otherwise the No branch of step 1210 is followed and step 1214 is performed.

In step 1212, test framework injection module 110 (see FIG. 1) injects an instance of the JPA entity manager indicated by the field being traversed. Following step 1212, the process of FIG. 12 loops back to step 1204 to traverse the next field of the EJB® bean loaded in step 1202.

In step 1214, common test case module 106 (see FIG. 1) determines whether or not the type of field being traversed indicates an EJB® bean. If step 1214 determines the field being traversed in the most recent performance of step 1204 does not indicate an EJB® bean based on the type of the field obtained in step 1204, then the No branch of step 1214 is taken and the process of FIG. 12 loops back to step 1204 to traverse the next field of the EJB® bean loaded in step 1202. Otherwise, common test case module 106 (see FIG. 1) determines that the type of the field being traversed indicates an EJB® bean (e.g., detects the annotation @EJB), the Yes branch of step 1214 is taken and step 1216 is performed.

In step 1216, common test case module 106 (see FIG. 1) determines whether or not the EJB® bean determined in step 1214 has any EJB® bean fields or a JPA entity manager field. If step 1216 determines the EJB® bean loaded in step 1202 has an EJB® bean field or a JPA entity manager field, then the Yes branch of step 1216 is followed and the process of FIG. 12 loops back to step 1202. If step 1216 determines the EJB® bean determined in step 1214 does not have an EJB® bean field, then the No branch of step 1216 is followed and step 1218 is performed. In step 1218, based on the EJB® bean determined in step 1214 not having any EJB® bean fields and not having a JPA entity manager field, test framework injection module 110 (see FIG. 1) initiates the field being traversed by injecting an instance of the EJB® bean indicated by the field being traversed. In one embodiment, the process of FIG. 12 is included in step 212 in FIG. 2.

Computer System

Figure 13:
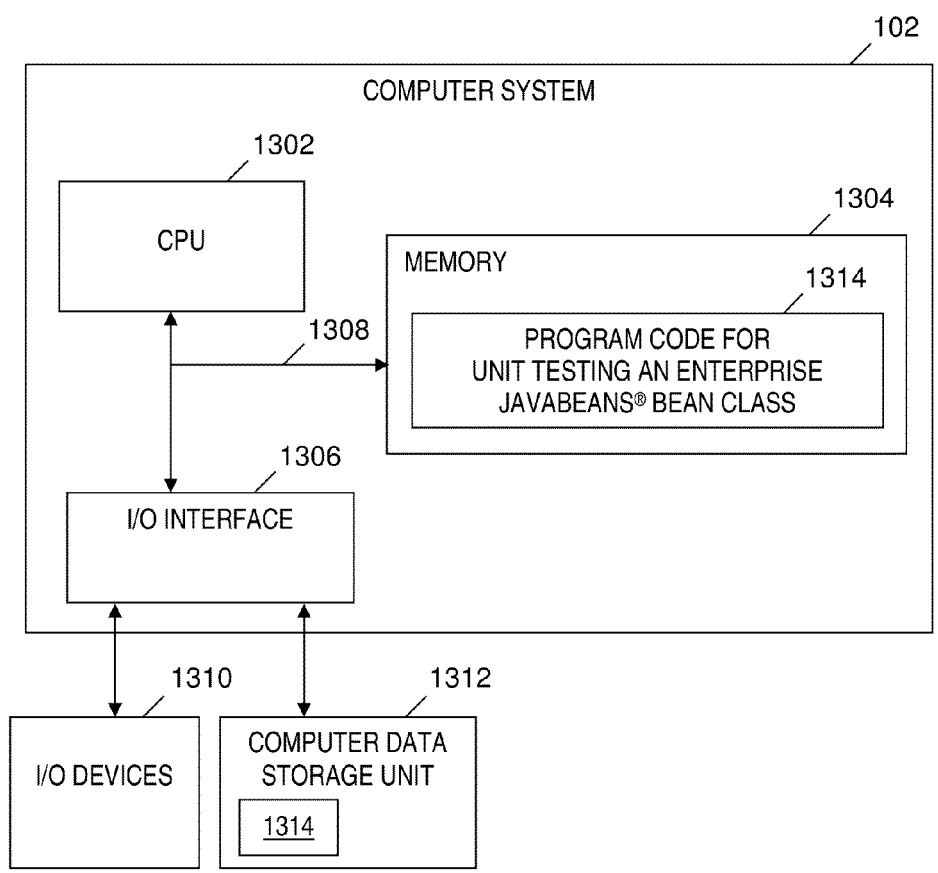
FIG. 13 is a block diagram of a computer system that is included in the system of FIG. 1 and that implements the process of FIG. 2, in accordance with embodiments of the present invention.

FIG. 13 is a block diagram of a computer system that is included in the system of FIG. 1 and that implements the process of FIG. 2, in accordance with embodiments of the present invention. Computer system 102 generally comprises a central processing unit (CPU) 1302, a memory 1304, an input/output (I/O) interface 1306, and a bus 1308. Further, computer system 102 is coupled to I/O devices 1310 and a computer data storage unit 1312. CPU 1302 performs computation and control functions of computer system 102, including carrying out instructions included in program code 1314 to perform a method of unit testing an EJB® bean class, where the instructions are carried out by CPU 1302 via memory 1304. CPU 1302 may comprise a single processing unit, or be distributed across one or more processing units in one or more locations (e.g., on a client and server). In one embodiment, program code 1314 includes program code included in modules 106, 108, 110, 112 and 114 in FIG. 1.

Memory 1304 may comprise any known computer-readable storage medium, which is described below. In one embodiment, cache memory elements of memory 1304 provide temporary storage of at least some program code (e.g., program code 1314) in order to reduce the number of times code must be retrieved from bulk storage while instructions of the program code are carried out. Moreover, similar to CPU 1302, memory 1304 may reside at a single physical location, comprising one or more types of data storage, or be distributed across a plurality of physical systems in various forms. Further, memory 1304 can include data distributed across, for example, a local area network (LAN) or a wide area network (WAN).

I/O interface 1306 comprises any system for exchanging information to or from an external source. I/O devices 1310 comprise any known type of external device, including a display device (e.g., monitor), keyboard, mouse, printer, speakers, handheld device, facsimile, etc. Bus 1308 provides a communication link between each of the components in computer system 102, and may comprise any type of transmission link, including electrical, optical, wireless, etc.

I/O interface 1306 also allows computer system 102 to store information (e.g., data or program instructions such as program code 1314) on and retrieve the information from computer data storage unit 1312 or another computer data storage unit (not shown). Computer data storage unit 1312 may comprise any known computer-readable storage medium, which is described below. For example, computer data storage unit 1312 may be a non-volatile data storage device, such as a magnetic disk drive (i.e., hard disk drive) or an optical disc drive (e.g., a CD-ROM drive which receives a CD-ROM disk).

Memory 1304 and/or storage unit 1312 may store computer program code 1314 that includes instructions that are carried out by CPU 1302 via memory 1304 to unit test an EJB® bean class. Although FIG. 13 depicts memory 1304 as including program code 1314, the present invention contemplates embodiments in which memory 1304 does not include all of code 1314 simultaneously, but instead at one time includes only a portion of code 1314.

Further, memory 1304 may include other systems not shown in FIG. 13, such as an operating system (e.g., a Linux® operating system) that runs on CPU 1302 and provides control of various components within and/or connected to computer system 102. Linux is a registered trademark of Linus Torvalds.

Storage unit 1312 and/or one or more other computer data storage units (not shown) that are coupled to computer system 102 may store test case 116 (see FIG. 1), test data 118 (see FIG. 1) and expected data 122 (see FIG. 1). Data repository 120 (see FIG. 1) may be storage unit 1312 or another computer data storage unit coupled to computer system 102.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 1304 and/or computer data storage unit 1312) having computer-readable program code (e.g., program code 1314) embodied or stored thereon.

Any combination of one or more computer-readable mediums (e.g., memory 1304 and computer data storage unit 1312) may be utilized. The computer-readable medium may be a computer-readable signal medium or a computer-readable storage medium. In one embodiment, the computer-readable storage medium is a tangible computer-readable storage device or a tangible computer-readable storage apparatus. A computer-readable storage medium may be, for example, but not limited to, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In one embodiment, a computer-readable storage medium is a tangible medium that can contain or store a program (e.g., program 1314) for use by or in connection with a system, apparatus, or device for carrying out instructions. Each of the terms "computer-readable storage medium" and "computer-readable hardware storage device," as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 1314) embodied on a computer-readable medium may be transmitted using any appropriate medium, including but not limited to wireless, wireline, optical fiber cable, RF, etc., or any suitable combination of the foregoing.

Computer program code (e.g., program code 1314) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 13. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2) and/or block diagrams of methods, apparatus (systems) (e.g., FIG. 1 and FIG. 13), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 1314). These computer program instructions may be provided to one or more hardware processors (e.g., CPU 1302) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 1304 or computer data storage unit 1312) that can direct a computer (e.g., computer system 102), other programmable data processing apparatus, or other devices to function in a particular manner, such that the instructions (e.g., program 1314) stored in the computer-readable medium produce an article of manufacture including instructions which implement the function/act specified in the flowchart and/or block diagram block or blocks. In one embodiment, the computer program instructions are stored in a tangible computer-readable storage device.

The computer program instructions may also be loaded onto a computer (e.g., computer system 102), other programmable data processing apparatus, or other devices to cause a series of operational steps to be performed on the computer, other programmable apparatus, or other devices to produce a computer-implemented process such that the instructions (e.g., program 1314) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to unit testing an EJB® bean class. Thus, an embodiment of the present invention discloses a process for supporting computer infrastructure, wherein the process comprises a first computer system providing at least one support service for at least one of integrating, hosting, maintaining and deploying computer-readable code (e.g., program code 1314) in a second computer system (e.g., computer system 102) comprising one or more processors (e.g., CPU 1302), wherein the processor(s) carry out instructions contained in the code causing the second computer system to unit test an EJB® bean class.

In another embodiment, the invention provides a method that performs the process steps of the invention on a subscription, advertising and/or fee basis. That is, a service provider, such as a Solution Integrator, can offer to create, maintain, support, etc. a process of unit testing an EJB® bean class. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2 and FIG. 12 and the block diagrams in FIG. 1 and FIG. 13 illustrate the architecture, functionality, and operation of possible implementations of systems, methods, and computer program products according to various embodiments of the present invention. In this regard, each block in the flowchart or block diagrams may represent a module, segment, or portion of code (e.g., program code 1314), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of unit testing an enterprise javabeans (EJB) bean, the method comprising the steps of:
    a computer initiating a test case for a unit testing of the EJB bean with test data, the step of initiating the test case including a step of the computer receiving an indication that indicates a JUnit testing mode, which is a technique of unit testing any EJB bean by employing JUnit testing in a unit testing framework for Java programming language;
    the computer determining the indication does not indicate an in-container testing mode, which is a technique of unit testing any EJB bean on an EJB container of a Websphere application server by employing annotation and runtime injection provided by EJB architecture;
    based on the received indication indicating the JUnit testing mode and not indicating the in-container testing mode, the computer initiating the unit testing of the EJB bean by performing the unit testing of the EJB bean in the JUnit testing mode, but not in the in-container testing mode, by injecting the EJB bean at runtime by creating an instance of a Plain Old Java Object (POJO) of the EJB bean, which employs an injection functionality provided by a CommonTestCase class that integrates a base class of the in-container testing mode and a base class of the JUnit testing mode, and the CommonTestCase class being an extension of a TestCase class of the JUnit testing mode;
    a test object in the injected EJB bean operating business logic on business data by performing a step of inserting the business data into a database, updating the business data in the database, deleting the business data from the database, or selecting the business data to send to a client, an outcome of the step of operating the business logic being a set of resulting business data;
    the computer retrieving expected data corresponding to the test data and subsequently, the computer asserting the set of resulting business data against the retrieved expected data;
    based on the step of asserting the set of resulting business data against the retrieved expected data, the computer determining the test case is executed successfully in the JUnit testing mode;
    based on the test case being executed successfully, the computer determining a status of the test object changing from unstable to stable; and
    based on the status of the test object changing from unstable to stable, the computer receiving a second indication that indicates the in-container testing mode but not the JUnit testing mode, and in response, the computer continuing the unit testing of the EJB bean by performing the unit testing of the EJB bean in the in-container testing mode by (1) re-using the test case without a change to the test case, the test case having been employed in the unit testing of the EJB bean in the JUnit testing mode and (2) the EJB container injecting the EJB bean directly by the injection functionality provided by the CommonTestCase class.

2. The method of claim 1, further comprising the steps of:
    subsequent to the step of injecting the EJB bean by the EJB container, the test object in the EJB bean operating the business logic on the business data by performing another step of inserting the business data into the database, updating the business data in the database, deleting the business data from the database, or selecting the business data to send to the client, an outcome of the step of operating the business logic subsequent to the step of injecting the EJB bean by the EJB container being a second set of resulting business data;
    the computer asserting the second set of resulting business data against the expected data; and
    based on the step of asserting the second set of resulting business data against the expected data, the computer determining the test case succeeds or fails.

3. The method of claim 1, wherein the step of performing the unit testing of the EJB bean in the in-container testing mode by re-using the test case implements functionality of a ServletTestSuite wrapper provided by an Apache Cactus unit testing framework.

4. The method of claim 1, further comprising the step of:
    the computer determining a status of a source code of the test object is unstable, wherein the step of receiving the indication that indicates the JUnit testing mode but not the in-container testing mode is based on the status of the source code being unstable.

5. The method of claim 1, wherein the step of initiating the unit testing of the EJB bean is performed in an environment provided by the Websphere application server without requiring a reboot or a redeployment of the Websphere application server.

6. The method of claim 1, further comprising the step of the computer automatically performing the unit testing of the EJB bean from a beginning of a preparation of the test data to an end of an assertion of the set of resulting business data, without requiring a manual preparation of the test data.

7. A computer system comprising:
    a central processing unit (CPU);
    a memory coupled to the CPU;
    a computer-readable storage device that is not a signal and that is coupled to the CPU, the storage device containing instructions that are carried out by the CPU via the memory to implement a method of unit testing an enterprise javabeans (EJB) bean, the method comprising the steps of:

the computer system initiating a test case for a unit testing of the EJB bean with test data, the step of initiating the test case including a step of the computer system receiving an indication that indicates a JUnit testing mode, which is a technique of unit testing any EJB bean by employing JUnit testing in a unit testing framework for Java programming language;

the computer determining the indication does not indicate an in-container testing mode, which is a technique of unit testing any EJB bean on an EJB container of a Websphere application server by employing annotation and runtime injection provided by EJB architecture;

based on the received indication indicating the JUnit testing mode and not indicating an in-container testing mode, the computer system initiating the unit testing of the EJB bean by performing the unit testing of the EJB bean in the JUnit testing mode, but not in the in-container testing mode, by injecting the EJB bean at runtime by creating an instance of a Plain Old Java Object (POJO) of the EJB bean, which employs an injection functionality provided by a CommonTestCase class that integrates a base class of the in-container testing mode and a base class of the JUnit testing mode, and the CommonTestCase class being an extension of a TestCase class of the JUnit testing mode;

a test object in the injected EJB bean operating business logic on business data by performing a step of inserting the business data into a database, updating the business data in the database, deleting the business data from the database, or selecting the business data to send to a client, an outcome of the step of operating the business logic being a set of resulting business data;

the computer system retrieving expected data corresponding to the test data and subsequently, the computer system asserting the set of resulting business data against the retrieved expected data; and based on the step of asserting the set of resulting business data against the retrieved expected data, the computer system determining the test case is executed successfully in the JUnit testing mode;

based on the test case being executed successfully, the computer system determining a status of the test object changing from unstable to stable; and based on the status of the test object changing from unstable to stable, the computer system receiving a second indication that indicates the in-container testing mode but not the JUnit testing mode, and in response, the computer system continuing the unit testing of the EJB bean by performing the unit testing of the EJB bean in the in-container testing mode by (1) re-using the test case without a change to the test case, the test case having been employed in the unit testing of the EJB bean in the JUnit testing mode and (2) the EJB container injecting the EJB bean directly by the injection functionality provided by the CommonTestCase class.

8. The computer system of claim 7, wherein the method further comprises the steps of:

subsequent to the step of injecting the EJB bean by the EJB container, the test object in the EJB bean operating the business logic on the business data by performing another step of inserting the business data into the database, updating the business data in the database, deleting the business data from the database, or selecting the business data to send to the client, an outcome of the step of operating the business logic subsequent to the step of injecting the EJB bean by the EJB container being a second set of resulting business data;

the computer system asserting the second set of resulting business data against the expected data; and based on the step of asserting the second set of resulting business data against the expected data, the computer system determining the test case succeeds or fails.

9. The computer system of claim 7, wherein the step of performing the nit testing of the EJB bean in the in-container testing mode by re-using the test case implements functionality of a ServletTestSuite wrapper provided by an Apache Cactus unit testing framework.

10. The computer system of claim 7, wherein the method further comprises the step of:

the computer system determining a status of a source code of the test object is unstable, wherein the step of receiving the indication that indicates the JUnit testing mode but not the in-container testing mode is based on the status of the source code being unstable.

11. The computer system of claim 7, wherein the step of initiating the unit testing of the EJB bean is performed in an environment provided by the Websphere application server without requiring a reboot or a redeployment of the Websphere application server.

12. The computer system of claim 7, wherein the method further comprises the step of the computer system automatically performing the unit testing of the EJB bean from a beginning of a preparation of the test data to an end of an assertion of the set of resulting business data, without requiring a manual preparation of the test data.

13. A computer program product, comprising:

a computer-readable storage device that is not a signal; and a computer-readable program code stored in the computer-readable storage device, the computer-readable program code containing instructions that are carried out by a central processing unit (CPU) of a computer system to implement a method of unit testing an enterprise javabeans (EJB) bean, the method comprising the steps of:

the computer system initiating a test case for a unit testing of the EJB bean with test data, the step of initiating the test case including a step of the computer system receiving an indication that indicates a JUnit testing mode, which is a technique of unit testing any EJB bean by employing JUnit testing in a unit testing framework for Java programming language;

the computer system determining the indication does not indicate an in-container testing mode, which is a technique of unit testing any EJB bean on an EJB container of a Websphere application server by employing annotation and runtime injection provided by EJB architecture;

based on the received indication indicating the JUnit testing mode and not indicating an in-container testing mode, the computer system initiating the unit testing of the EJB bean by performing the unit testing of the EJB bean in the JUnit testing mode, but not in the in-container testing mode, by injecting the EJB bean at runtime by creating an instance of a Plain Old Java Object (POJO) of the EJB bean, which employs an injection functionality provided by a CommonTestCase class that integrates a base class of the in-container testing mode and a base class of the JUnit testing mode, and the CommonTestCase class being an extension of a TestCase class of the JUnit testing mode;

a test object in the injected EJB bean operating business logic on business data by performing a step of inserting the business data into a database, updating the business data in the database, deleting the business data from the database, or selecting the business data to send to a client, an outcome of the step of operating the business logic being a set of resulting business data;

the computer system retrieving expected data corresponding to the test data and subsequently, the computer system asserting the set of resulting business data against the retrieved expected data; and based on the step of asserting the set of resulting business data against the retrieved expected data, the computer system determining the test case is executed successfully in the JUnit testing mode;

based on the test case being executed successfully, the computer system determining a status of the test object changing from unstable to stable; and based on the status of the test object changing from unstable to stable, the computer system receiving a second indication that indicates the in-container testing mode but not the JUnit testing mode, and in response, the computer system continuing the unit testing of the EJB bean by performing the unit testing of the EJB bean in the in-container testing mode by (1) re-using the test case without a change to the test case, the test case having been employed in the unit testing of the EJB bean in the JUnit testing mode and (2) the EJB container injecting the EJB bean directly by the injection functionality provided by the CommonTestCase class.

14. The program product of claim 13, wherein the method further comprises the steps of:

subsequent to the step of injecting the EJB bean by the EJB container, the test object in the EJB bean operating the business logic on the business data by performing another step of inserting the business data into the database, updating the business data in the database, deleting the business data from the database, or selecting the business data to send to the client, an outcome of the step of operating the business logic subsequent to the step of injecting the EJB bean by the EJB container being a second set of resulting business data;

the computer system asserting the second set of resulting business data against the expected data; and based on the step of asserting the second set of resulting business data against the expected data, the computer system determining the test case succeeds or fails.

15. The program product of claim 13, wherein the step of performing the unit testing of the EJB bean in the in-container testing mode by re-using the test case implements functionality of a ServletTestSuite wrapper provided by an Apache Cactus unit testing framework.

16. The method of claim 1, further comprising:

providing at least one support service for at least one of creating, integrating, hosting, maintaining, and deploying computer-readable program code in the computer, the program code being executed by a processor of the computer to implement the steps of initiating the test case, determining the indication does not indicate the in-container testing mode, initiating the unit testing, operating the business logic, retrieving the expected data, asserting, determining the test case is executed successfully, determining the status of the test object, receiving the second indication, continuing the unit testing.

17. The computer program product of claim 13, wherein the method further comprises the step of:

the computer system determining a status of a source code of the test object is unstable, wherein the step of receiving the indication that indicates the JUnit testing mode but not the in-container testing mode is based on the status of the source code being unstable.

18. The computer program product of claim 13, wherein the step of initiating the unit testing of the EJB bean is performed in an environment provided by the Websphere application server without requiring a reboot or a redeployment of the Websphere application server.

19. The computer program product of claim 13, wherein the method further comprises the step of the computer system automatically performing the unit testing of the EJB bean from a beginning of a preparation of the test data to an end of an assertion of the set of resulting business data, without requiring a manual preparation of the test data.

* * * * *